United States Patent
Billings

[15] 3,666,281
[45] May 30, 1972

[54] SLED FOR SNOW OR WATER

[72] Inventor: William Charles Billings, 95 Rose Lane, Redding, Calif. 96001

[22] Filed: Dec. 22, 1969

[21] Appl. No.: 887,231

[52] U.S. Cl. ..................................280/12 KL, 9/310, 280/15
[51] Int. Cl. ..................................................B62b 13/04
[58] Field of Search ....................280/15, 16, 12 R, 12 KL; 9/310.3

[56] References Cited

UNITED STATES PATENTS

| | | | |
|---|---|---|---|
| 3,120,011 | 2/1964 | Gunderson | 280/12 |
| 3,145,399 | 8/1964 | Jackson | 9/310.2 |
| 3,360,038 | 8/1967 | Cohen | 9/310.3 |

*Primary Examiner*—Benjamin Hersh
*Assistant Examiner*—Robert R. Song
*Attorney*—Mallinckrodt & Mallinckrodt, P. H. Mallinckrodt, Philip A. Mallinckrodt and Kay S. Cornaby

[57] ABSTRACT

A main, ski-like runner is flanked by a pair of auxiliary, outrigger, ski-like runners and is provided with a low seat on the main runner, rearwardly thereof. Rests for the heels of the rider's feet are positioned forwardly on the auxiliary runners, and an elongate, stabilizing hand-hold extends forwardly from the seat on and longitudinally of the main runner. The auxiliary runners diverge outwardly and forwardly from the main runner and the footrests are preferably formed as forwardly sloping and outwardly turned heel-retaining pad ends of a bar secured to and extending transversely of the runners. The stabilizing hand-hold is preferably a single bar of plastic material sloping upwardly and forwardly from somewhat below seat level immediately in front of the seat.

5 Claims, 7 Drawing Figures

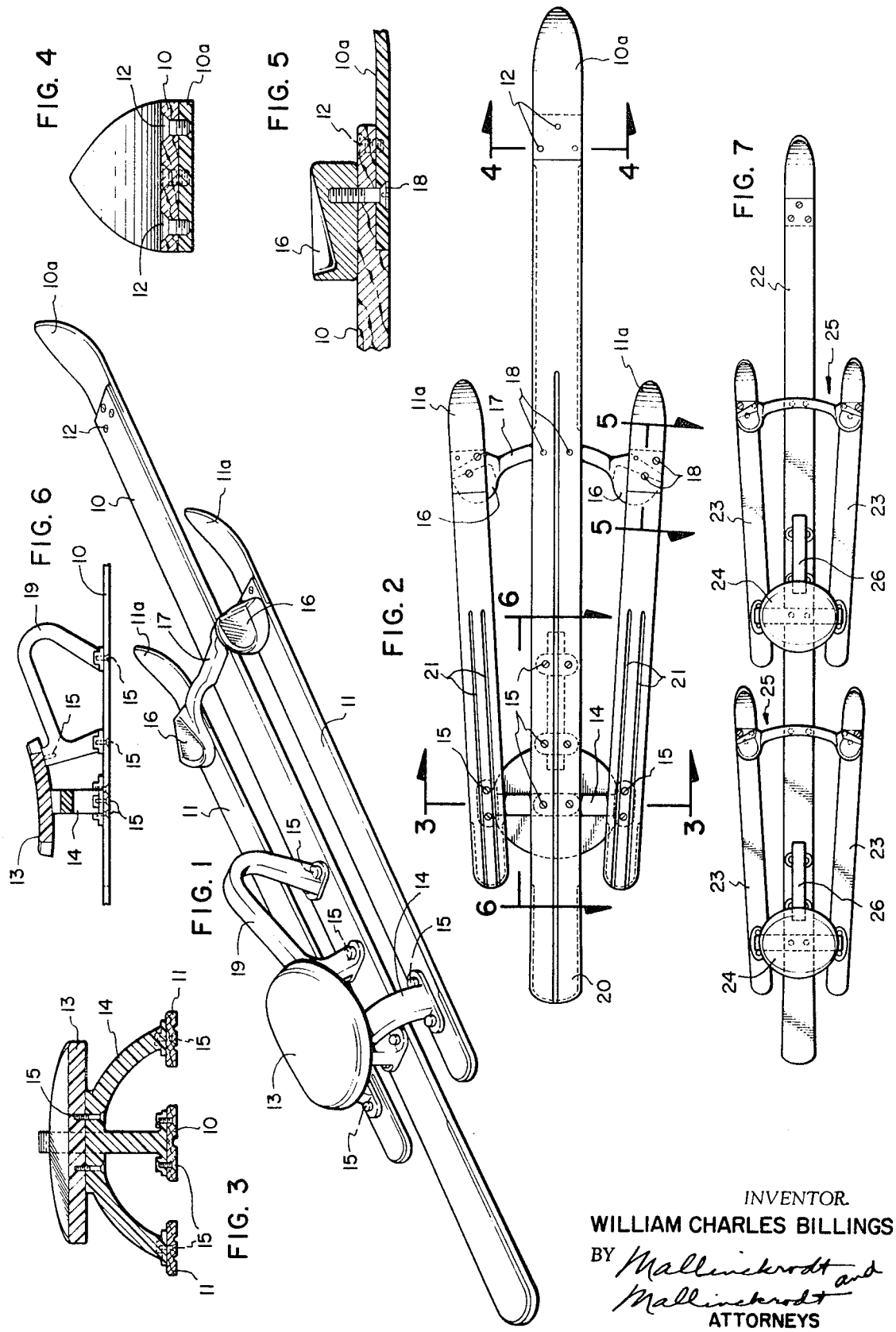

3,666,281

SLED FOR SNOW OR WATER

BACKGROUND OF THE INVENTION

1. Field:

The invention is in the field of recreational sleds, both those intended for use on snow-covered slopes and those intended to be towed behind a boat for running on the surface of a body of water.

2. State of the Art:

Although recreational sleds of many types have long been common, there have been few adapted for downhill use on ski slopes. One of the few is the sled or ski plane having ski-like runners shown and described in my U.S. Pat. No. 2,616,715, dated Nov. 4, 1952, and entitled "Ski-Sled".

BRIEF SUMMARY OF THE INVENTION

The present invention provides an improved sled or ski-plane of the same type as that of my aforesaid patent. Thus, as presently constructed, the sled or ski-plane has a main ski-like runner flanked by shorter auxiliary runners, a low-level seat positioned rearwardly on the main runner, rests for the rider's feet positioned on the auxiliary runners forwardly of the seat, and rider stabilizing means extending forwardly from the seat. However, instead of facilitating turning of the sled by the provision of outwardly flared grooves in the respective runners, the auxiliary runners in the present sled are secured to the main runner in mutually similar, outwardly and forwardly divergent relationship therewith. This has been found to be far superior to the original arrangement and to provide exceptionally effective control for executing ski-like turns during downhill runs of the sled. The grooves in the bottoms of the runners preferably extend parallel with the respective runners and only about midway of the lengths thereof from the rear ends thereof.

Further facility in turning of the sled by shifting of body weight by the rider is given by provision of the rests for the rider's feet as forwardly sloping and outwardly turned heel pads and by making the rider stabilizing means in the form of a single bar positioned on the main runner immediately in front of the seat and sloping upwardly and forwardly from somewhat below the level of the seat. The heel pads constructed in this way force separation of the rider's knees, which is important for the achievement of positive directional control.

The stabilizer bar is preferably molded from plastic material to prevent freezing adhesion thereto of the rider's hands or gloves. The rests for the rider's feet are also preferably molded integrally from plastic material, as are the seat and its support.

THE DRAWING

Single and tandem dual sleds representing the best mode presently contemplated of carrying out the invention are shown in the accompanying drawing, in which:

FIG. 1 is a pictorial view looking from the rear and one side at the top of the single sled as dimensioned primarily for snow skiing;

FIG. 2, a bottom plan view;

FIG. 3, a transverse vertical section taken along the line 3—3 of FIG. 2;

FIG. 4, a similar section taken along the line 4—4 of FIG. 2;

FIG. 5, a fragmentary, longitudinal, vertical section taken along the line 5—5 of FIG. 2;

FIG. 6, a similar section taken along the line 6—6 of FIG. 1; and

FIG. 7, a top plan view of the tandem dual sled, showing certain hidden structure by dotted lines.

DETAILED DESCRIPTION OF ILLUSTRATED EMBODIMENTS

The single sled of FIGS. 1–6 comprises a ski-like main runner 10 flanked by shorter, ski-like, auxiliary runners 11 carried by the main runner in outrigger fashion. As shown, the several runners have separate replaceable tips, 10a and 11a, of thinner more flexible material attached as by means of screws 12. The tips may be of a tough and strong plastic or of metal, while the runners proper may be of wood or any other suitable material or materials.

Rearwardly on main runner 10 is a low-level seat 13 supported by a leg structure 14 that spans the several runners transversely and that rigidly secures them to one another. Such leg structure is fastened to the respective runners and to the seat by screws 15 and is advantageously molded to form from a strong plastic material, as is the seat.

Spaced forwardly from the seat and positioned on the auxiliary runners 11, respectively, are rests 16 for the feet of a rider. These are advantageously formed, as shown, as opposite ends of a transverse bar 17 and are configurated as forwardly and upwardly sloping and outwardly turned heel pads recessed to receive the heels of boots or other footwear worn by the rider. The heel pads 16 and bar 17 are rigidly fastened to the respective runners, as shown, by means of screws 18. Like seat 13 and its supporting leg structure 14, these heel pads and bar are preferably molded integrally from a suitable plastic material.

Fastened to main runner 10 immediately in front of seat 13 and to the seat itself, as shown, by means of additional screws 15, and extending forwardly therefrom as rider stabilizing means is a single bar 19, advantageously also molded from a strong plastic material to provide grasping surfaces that minimize freezing adherence thereto of the rider's hands or gloves. Such bar 19 slopes upwardly and forwardly from somewhat below the level of the seat.

In the sled as constructed prior to the present invention, turning during downhill runs by the rider shifting his weight from side to side was facilitated by outwardly and forwardly divergent, longitudinal grooves in the bottoms of the runners. In the sled of the present invention, considerably greater facility and positive control are provided by securing auxiliary runners 11 in mutually similar, outwardly and forwardly divergent relationship with centrally located main runner 10. The precise extent of divergency is not critical, although an angle between the axis of the main runner and the axis of either one or the other auxiliary runner of about 5° is preferred. Generally speaking, the angle should not be less than 1° nor more than 10, although in a sled for use on water, the angle may be as little as one-half a degree and the runners should be wider than for use on snow, e.g. main runner about 7 inches as compared with about 4 inches and auxiliary runners about 5 inches as compared with about 3 inches. Moreover, for use on water the auxiliary runners should have their rear ends more or less in line transversely with the rear end of the main runner, but should be shorter than the main runner by about a foot in 6 feet of length.

In the present form of sled the longitudinal grooves in the bottoms of the runners, here shown as a single groove 20 for main runner 10 and as double grooves 21 for auxiliary runners 11, are parallel with the longitudinal axes of the respective runners and extend about midway of such runners from the rear ends thereof.

The dual tandem seated sled shown in FIG. 7 is similar to the single seated sled of FIGS. 1 – 6, except for having a single main runner 22 flanked by tandem sets of auxiliary runners 23 and for having two seats 24, two footrests 25, and two stabilizer bars 26, all in tandem as illustrated.

Whereas this invention is here described and illustrated with respect to certain preferred forms thereof, it is to be understood that many variations are possible without departing from the inventive concepts particularly pointed out in the claims.

I claim:

1. A sled of the type having a main ski-line runner flanked by a pair of auxiliary, outrigger, ski-like runners spaced from and secured to said main runner, said sled being provided with a low-slung seat on the main runner and rider stabilizing means; transverse bar structure disposed forwardly of the seat and extending across and secured to said main runner and said auxiliary runner; and forwardly and upwardly sloping heel conforming and receiving pads formed integrally with said bar structure at the ends thereof and disposed on said auxiliary runners.

2. Sled according to claim 1, wherein the rider stabilizing means is formed as a single bar positioned on the main runner immediately in front of the seat and sloping upwardly and forwardly from somewhat below the level of the seat to facilitate weight shifting.

3. The improved sled of claim 1, wherein the runners are provided with grooves extending longitudinally of and about midway of the respective runners from the rear end thereof and parallel with the respective runners.

4. Sled according to claim 1, wherein the heel pads are outwardly turned.

5. Sled according to claim 4, wherein the transverse bar structure and the heel pads are molded integrally from a plastic material.

* * * * *